US011672027B2

(12) United States Patent
Liu et al.

(10) Patent No.: US 11,672,027 B2
(45) Date of Patent: Jun. 6, 2023

(54) MANAGING AN OVERLAP BETWEEN DOWNLINK REFERENCE SIGNALS

(71) Applicant: QUALCOMM Incorporated, San Diego, CA (US)

(72) Inventors: Le Liu, Fremont, CA (US); Alberto Rico Alvarino, San Diego, CA (US); Wanshi Chen, San Diego, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 16/418,493

(22) Filed: May 21, 2019

(65) Prior Publication Data

US 2020/0045750 A1    Feb. 6, 2020

Related U.S. Application Data

(60) Provisional application No. 62/714,579, filed on Aug. 3, 2018.

(51) Int. Cl.
*H04W 74/08* (2009.01)
*H04B 7/0413* (2017.01)
(Continued)

(52) U.S. Cl.
CPC ...... *H04W 74/0891* (2013.01); *H04B 7/0413* (2013.01); *H04L 5/0035* (2013.01);
(Continued)

(58) Field of Classification Search
None
See application file for complete search history.

(56) References Cited

U.S. PATENT DOCUMENTS 9,723,437 B1   8/2017 Bitra et al.
10,333,670 B2 * 6/2019 Rico Alvarino ...... H04W 56/00
(Continued)

FOREIGN PATENT DOCUMENTS

WO    2014109686 A1    7/2014

OTHER PUBLICATIONS

Huawei et al., "On NPRS for OTDOA", 3GPP Draft; R1-1805284, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018 Apr. 16, 2018, XP051427526, Retrieved from the Internet: URL:http://www.3gpp.org/ftp/Meetings%5F3GPP%5FSYNC/RAN1/Docs/ [retrieved on Apr. 16, 2018], sections 1, 2, 3, 3.1, figures 3, 10-12, 8 pages.

(Continued)

*Primary Examiner* — Christopher T Wyllie
(74) *Attorney, Agent, or Firm* — MG-IP Law, P.C.

(57) ABSTRACT

In an embodiment, a UE selects between RS collision protocols to selectively monitor, on downlink resource(s) scheduled with overlapping transmissions of first and second RS types, either the first RS type or neither RS type. In another embodiment, a base station determines that a downlink resource(s) are scheduled with overlapping transmissions of first and second RS types, punctures the second RS type, and selectively transmits the first RS type on the overlapped downlink resource(s). In another embodiment, a base station establishes non-overlapping NPRS and eNPRS transmission schedules.

28 Claims, 15 Drawing Sheets

(51) Int. Cl.
*H04L 5/00* (2006.01)
*H04W 72/1268* (2023.01)
*H04L 5/14* (2006.01)
*H04W 72/0446* (2023.01)
*H04W 72/12* (2023.01)
*H04W 88/06* (2009.01)

(52) U.S. Cl.
CPC .......... *H04L 5/0048* (2013.01); *H04L 5/1469* (2013.01); *H04W 72/0446* (2013.01); *H04W 72/12* (2013.01); *H04W 72/1268* (2013.01); *H04W 88/06* (2013.01)

(56) References Cited

U.S. PATENT DOCUMENTS

| | | | |
|---|---|---|---|
| 2011/0199986 A1* | 8/2011 | Fong | H04L 5/0073 370/329 |
| 2012/0076106 A1* | 3/2012 | Bhattad | H04L 5/0064 370/328 |
| 2012/0113844 A1* | 5/2012 | Krishnamurthy | H04W 24/02 370/252 |
| 2012/0207126 A1* | 8/2012 | Qu | H04L 5/0005 370/329 |
| 2012/0231809 A1* | 9/2012 | Siomina | H04W 64/00 455/456.1 |
| 2013/0242895 A1* | 9/2013 | Chen | H04W 72/23 370/329 |
| 2015/0036616 A1* | 2/2015 | Lee | H04L 5/0053 370/329 |
| 2015/0092582 A1 | 4/2015 | Liao et al. | |
| 2015/0256312 A1* | 9/2015 | Yi | H04L 5/0082 370/329 |
| 2016/0050686 A1* | 2/2016 | Krishnamoorthi | H04L 1/188 455/418 |
| 2016/0330005 A1 | 11/2016 | Bhattad et al. | |
| 2018/0007707 A1* | 1/2018 | Rico Alvarino | H04L 12/28 |
| 2018/0097596 A1* | 4/2018 | Palanivelu | H04W 56/001 |
| 2018/0175983 A1* | 6/2018 | Yum | H04L 5/0053 |
| 2020/0045750 A1* | 2/2020 | Liu | H04W 72/0446 |
| 2020/0389270 A1* | 12/2020 | Lee | H04L 5/0048 |

OTHER PUBLICATIONS

International Search Report and Written Opinion—PCT/US2019/040618—ISA/EPO—dated Jan. 17, 2020.
Ericsson: "DL DMRS Design for for Short TTI", 3GPP Draft; R1-1708866, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 14, 2017, XP051274049, Retrieved from the Internet: URL:http://www.3gpp.org/ftp/Meetings_3GPP_SYNC/RAN1/Docs/ [retrieved on May 14, 2017], 15 pages.
LG Electronics: "Discussions on sPDSCH and DMRS Design", 3GPP Draft; R1-1611777 Discussions on SPDSCH and DMRS Design, 3rd Generation Partnership Project (3GPP), Mobile Competence Centre; 650, Route Des Lucioles; F-06921 Sophia-Antipolis Cedex; France, vol. RAN WG1, no. Reno, USA; Nov. 14, 2016-Nov. 18, 2016, Nov. 13, 2016, XP051175746, 6 pages, Retrieved from the Internet: URL: http://www.3gpp.org/ftp/Meetings_3GPP_SYNC/RAN1/Docs/ [retrieved on Nov. 13, 2016] figure 3 sections 2.2.1, 2.2.2.
Partial International Search Report—PCT/US2019/040618—ISA/EPO—dated Oct. 17, 2019.
Samsung et al: "NB-LTE—Inband Operation", 3GPP Draft; RP-151557_NB-LTE—Inband Operation (Update of RP-151379), 3rd Generation Partnership Project (3GPP), Mobile Competence Centre; 650, Route Des Lucioles; F-06921 Sophia-Antipolis Cedex; vol. TSG RAN, No. Phoenix, USA; Sep. 14, 2015-Sep. 16, 2015, Sep. 15, 2015, XP051654405, 14 pages, Retrieved from the Internet: URL: http://www.3gpp.org/ftp/tsg%5Fran/TSG%5FRAN/TSGR%5F69/Docs/RP%2D151557%2Ezip [retrieved on Sep. 15, 2015].
Qualcomm Incorporated: "NPRS Enhancement", 3GPP TSG RAN WG1 Meeting #93, R1-1807094, No. Busan, Korea, May 21, 2018-May 25, 2018, pp. 1-9.
Taiwan Search Report—TW108123394—TIPO—dated Dec. 30, 2022.

* cited by examiner

MANAGING AN OVERLAP BETWEEN DOWNLINK REFERENCE SIGNALS

CROSS-REFERENCE TO RELATED APPLICATION

The present Application for Patent claims the benefit of U.S. Provisional Patent Application No. 62/714,579 entitled, "MANAGING AN OVERLAP BETWEEN DOWNLINK REFERENCE SIGNALS", filed Aug. 3, 2018, and assigned to the assignee hereof and hereby expressly incorporated herein by reference in its entirety.

TECHNICAL FIELD

Various aspects described herein generally relate to managing an overlap between downlink reference signals.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device may also transmit its own ranging signal(s) that are measured by the two or more network nodes, either as part of a separate positioning procedure or to facilitate calculation of round trip propagation time (RTT) between the mobile device and the two or more network nodes.

SUMMARY

An embodiment is directed to a method of operating a user equipment (UE), comprising selecting one of a plurality of Reference Signal (RS) collision protocols based on one or more parameters, each of the plurality of RS collision protocols characterizing a manner by which the UE handles an overlap on at least one downlink resource of an RS of a first RS type scheduled in accordance with a first transmission schedule and an RS of a second RS type scheduled in accordance with a second transmission schedule, the plurality of RS collision protocols including (i) a first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, and (ii) a second RS collision protocol characterized by the UE puncturing both the RS of the first RS type and the RS of the second RS type from the first and second transmission schedules, respectively, on the at least one overlapped downlink resource, and selectively monitoring the at least one overlapped downlink resource in accordance with the selected RS collision protocol.

Another embodiment is directed to a method of operating a base station, comprising determining that a transmission of a Reference Signal (RS) of a first RS type that is scheduled in accordance with a first transmission schedule overlaps on at least one downlink resource with a transmission of an RS of a second RS type that is scheduled in accordance with a second transmission schedule, puncturing, in response to the determining, the RS of the second RS type from the second transmission schedule on the at least one overlapped downlink resource, and selectively transmitting the RS of the first RS type on the at least one overlapped downlink resource.

Another embodiment is directed to a method of operating a base station, comprising determining a first transmission schedule for a Narrowband Positioning Reference Signal (NPRS) of a first NPRS type, establishing one or more parameters for a second transmission schedule for an NPRS of a second NPRS type such that no overlap occurs on any downlink resource between transmissions of the NPRS of the first NPRS type in accordance with the first transmission schedule and transmissions of the NPRS of the second NPRS type in accordance with the second transmission schedule, transmitting the NPRS of the first NPRS type in accordance with the first transmission schedule, and transmitting the NPRS of the second NPRS type in accordance with the second transmission schedule.

Another embodiment is directed to a user equipment (UE), comprising means for selecting one of a plurality of Reference Signal (RS) collision protocols based on one or more parameters, each of the plurality of RS collision protocols characterizing a manner by which the UE handles an overlap on at least one downlink resource of an RS of a first RS type scheduled in accordance with a first transmission schedule and an RS of a second RS type scheduled in accordance with a second transmission schedule, the plurality of RS collision protocols including (i) a first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, and (ii) a second RS collision protocol characterized by the UE puncturing both the RS of the first RS type and the RS of the second RS type from the first and second transmission schedules, respectively, on the at least one overlapped downlink resource, and means for selectively monitoring the at least one overlapped downlink resource in accordance with the selected RS collision protocol.

Another embodiment is directed to a base station, comprising means for determining that a transmission of a Reference Signal (RS) of a first RS type that is scheduled in accordance with a first transmission schedule overlaps on at least one downlink resource with a transmission of an RS of a second RS type that is scheduled in accordance with a second transmission schedule, means for puncturing, in response to the determination, the RS of the second RS type from the second transmission schedule on the at least one overlapped downlink resource, and means for selectively transmitting the RS of the first RS type on the at least one overlapped downlink resource.

Another embodiment is directed to a base station, comprising means for determining a first transmission schedule for a Narrowband Positioning Reference Signal (NPRS) of a first NPRS type, means for establishing one or more parameters for a second transmission schedule for an NPRS of a second NPRS type such that no overlap occurs on any downlink resource between transmissions of the NPRS of the first NPRS type in accordance with the first transmission schedule and transmissions of the NPRS of the second NPRS type in accordance with the second transmission schedule, means for transmitting the NPRS of the first NPRS type in accordance with the first transmission schedule, and means for transmitting the NPRS of the second NPRS type in accordance with the second transmission schedule.

Another embodiment is directed to a user equipment (UE), comprising a memory, and at least one processor coupled to the memory and at least one transceiver and configured to select one of a plurality of Reference Signal (RS) collision protocols based on one or more parameters, each of the plurality of RS collision protocols characterizing a manner by which the UE handles an overlap on at least one downlink resource of an RS of a first RS type scheduled in accordance with a first transmission schedule and an RS of a second RS type scheduled in accordance with a second transmission schedule, the plurality of RS collision protocols including (i) a first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, and (ii) a second RS collision protocol characterized by the UE puncturing both the RS of the first RS type and the RS of the second RS type from the first and second transmission schedules, respectively, on the at least one overlapped downlink resource, and selectively monitor the at least one overlapped downlink resource in accordance with the selected RS collision protocol.

Another embodiment is directed to a base station, comprising a memory, and at least one processor coupled to the memory and at least one transceiver and configured to determine that a transmission of a Reference Signal (RS) of a first RS type that is scheduled in accordance with a first transmission schedule overlaps on at least one downlink resource with a transmission of an RS of a second RS type that is scheduled in accordance with a second transmission schedule, puncture, in response to the determination, the RS of the second RS type from the second transmission schedule on the at least one overlapped downlink resource, and selectively transmit the RS of the first RS type on the at least one overlapped downlink resource.

Another embodiment is directed to a base station, comprising a memory, and at least one processor coupled to the memory and at least one transceiver and configured to determine a first transmission schedule for a Narrowband Positioning Reference Signal (NPRS) of a first NPRS type, establish one or more parameters for a second transmission schedule for an NPRS of a second NPRS type such that no overlap occurs on any downlink resource between transmissions of the NPRS of the first NPRS type in accordance with the first transmission schedule and transmissions of the NPRS of the second NPRS type in accordance with the second transmission schedule, transmit the NPRS of the first NPRS type in accordance with the first transmission schedule, and transmit the NPRS of the second NPRS type in accordance with the second transmission schedule.

Another embodiment is directed to a non-transitory computer-readable medium containing instructions stored thereon, which, when executed by a user equipment (UE), cause the UE to perform operations, the instructions comprising at least one instruction configured to cause the UE to select one of a plurality of Reference Signal (RS) collision protocols based on one or more parameters, each of the plurality of RS collision protocols characterizing a manner by which the UE handles an overlap on at least one downlink resource of an RS of a first RS type scheduled in accordance with a first transmission schedule and an RS of a second RS type scheduled in accordance with a second transmission schedule, the plurality of RS collision protocols including (i) a first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, and (ii) a second RS collision protocol characterized by the UE puncturing both the RS of the first RS type and the RS of the second RS type from the first and second transmission schedules, respectively, on the at least one overlapped downlink resource, and at least one instruction configured to cause the UE to selectively monitor the at least one overlapped downlink resource in accordance with the selected RS collision protocol.

Another embodiment is directed to a non-transitory computer-readable medium containing instructions stored thereon, which, when executed by a base station, cause the base station to perform operations, the instructions comprising at least one instruction configured to cause the base station to determine that a transmission of a Reference Signal (RS) of a first RS type that is scheduled in accordance with a first transmission schedule overlaps on at least one downlink resource with a transmission of an RS of a second RS type that is scheduled in accordance with a second transmission schedule, at least one instruction configured to cause the base station to puncture, in response to the determination, the RS of the second RS type from the second transmission schedule on the at least one overlapped downlink resource, and at least one instruction configured to cause the base station to selectively transmit the RS of the first RS type on the at least one overlapped downlink resource.

Another embodiment is directed to a non-transitory computer-readable medium containing instructions stored thereon, which, when executed by a base station, cause the base station to perform operations, the instructions comprising at least one instruction configured to cause the base station to determine a first transmission schedule for a Narrowband Positioning Reference Signal (NPRS) of a first NPRS type, at least one instruction configured to cause the base station to establish one or more parameters for a second transmission schedule for an NPRS of a second NPRS type such that no overlap occurs on any downlink resource between transmissions of the NPRS of the first NPRS type in accordance with the first transmission schedule and transmissions of the NPRS of the second NPRS type in accordance with the second transmission schedule, at least one instruction configured to cause the base station to transmit the NPRS of the first NPRS type in accordance with the first transmission schedule, and at least one instruction configured to cause the base station to transmit the NPRS of the second NPRS type in accordance with the second transmission schedule.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
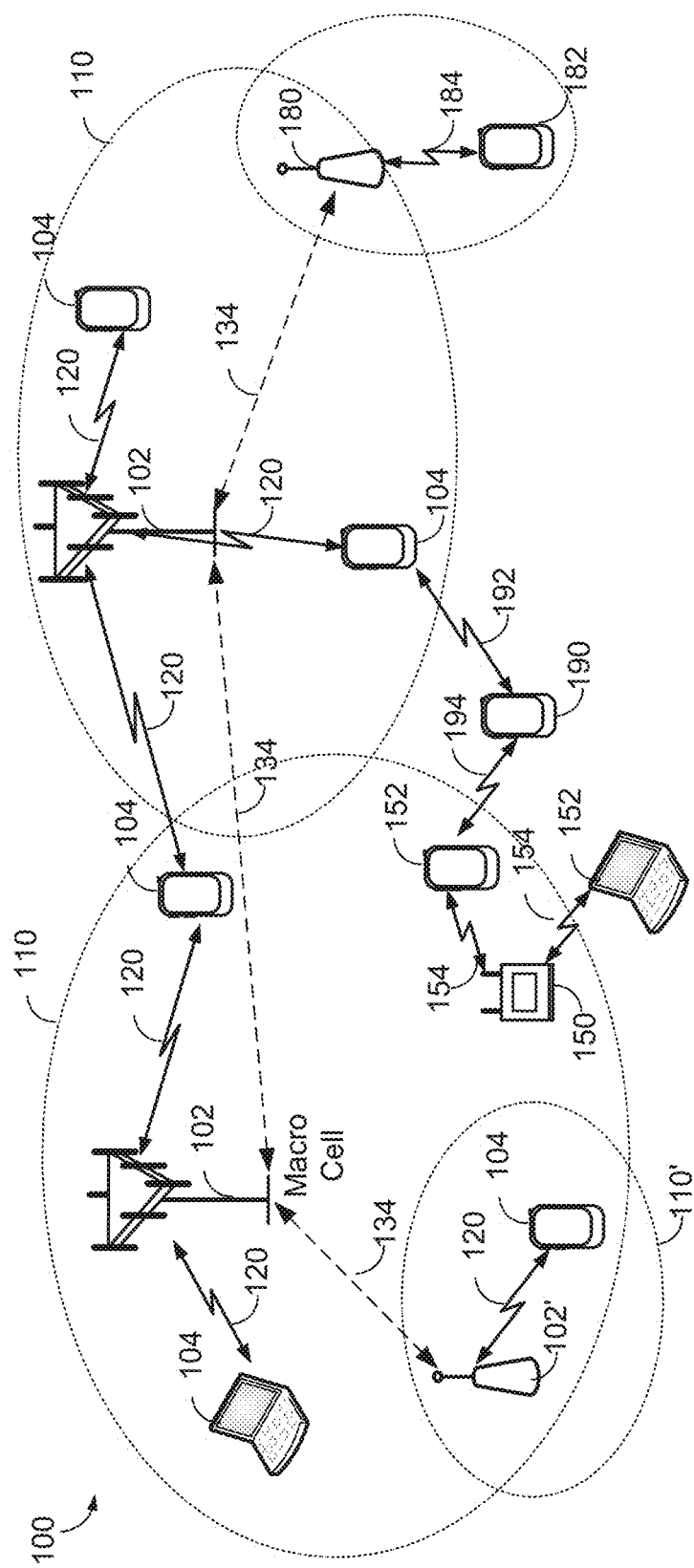
FIG. 1 illustrates an exemplary wireless communications system, according to various aspects.

Various aspects described herein generally relate to managing overlap between downlink reference signals.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
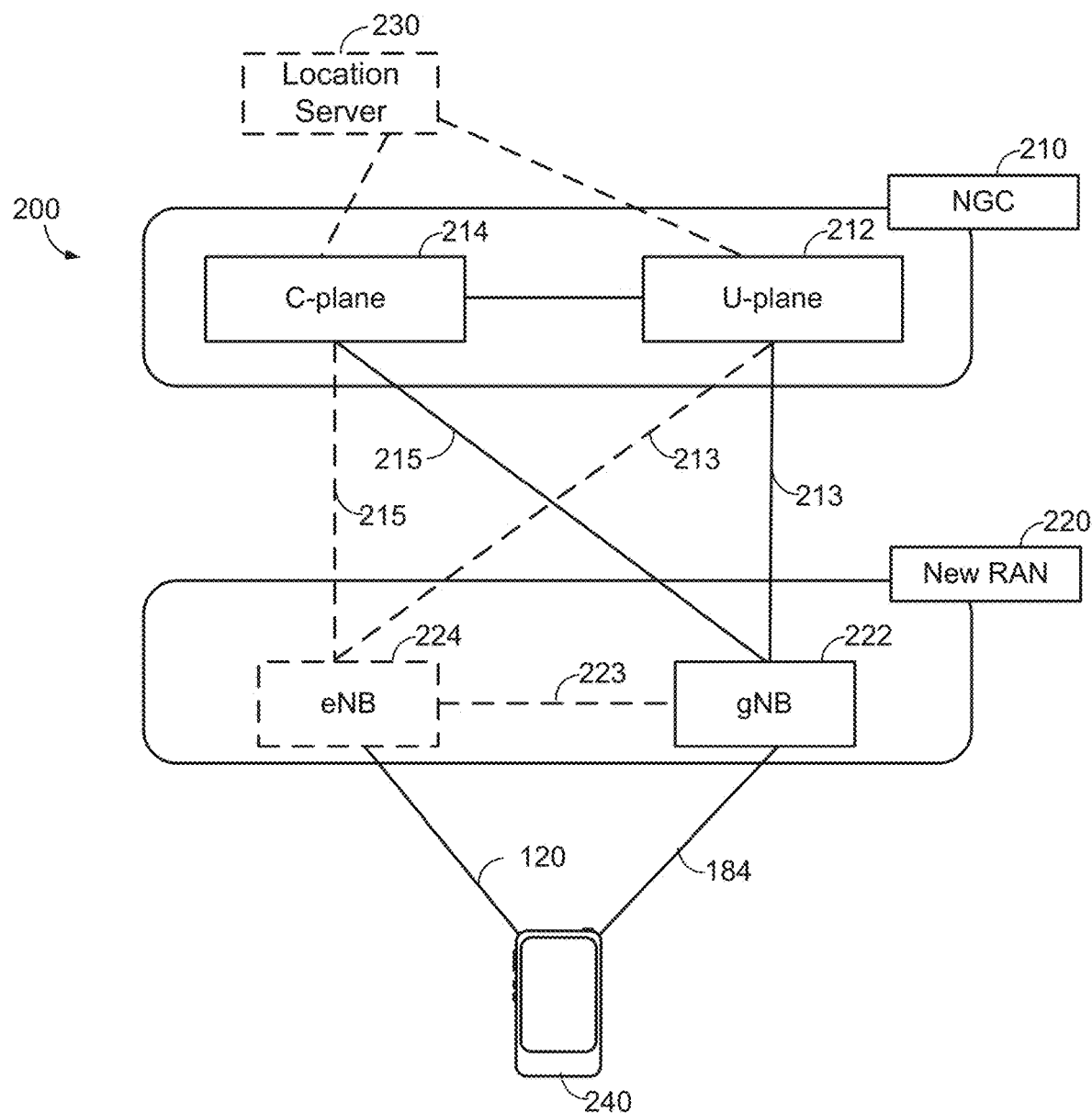
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include location server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
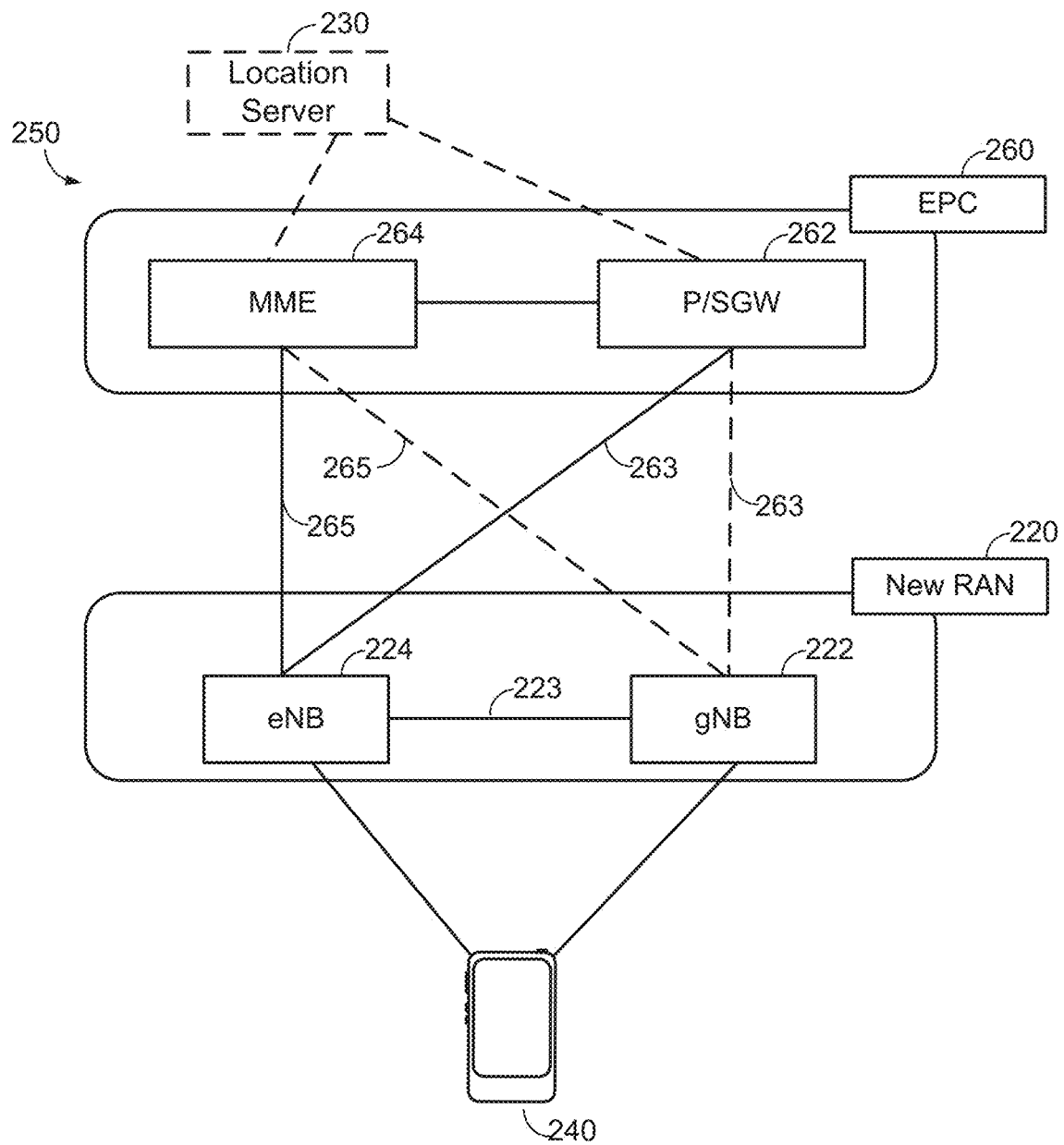

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include location server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3A:
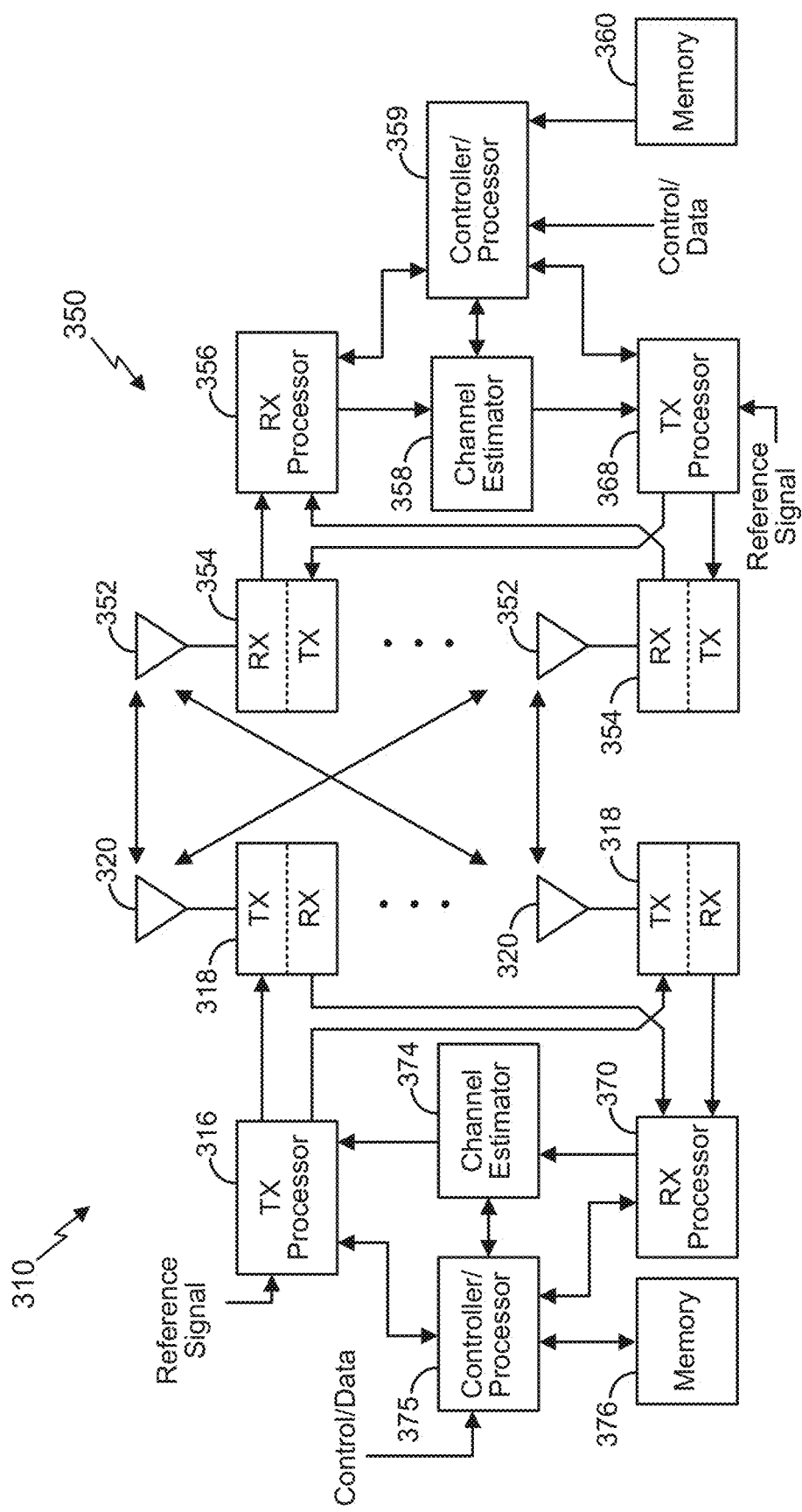
FIG. 3A illustrates an exemplary base station and an exemplary user equipment (UE) in an access network, according to various aspects.

According to various aspects, FIG. 3A illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 3B:
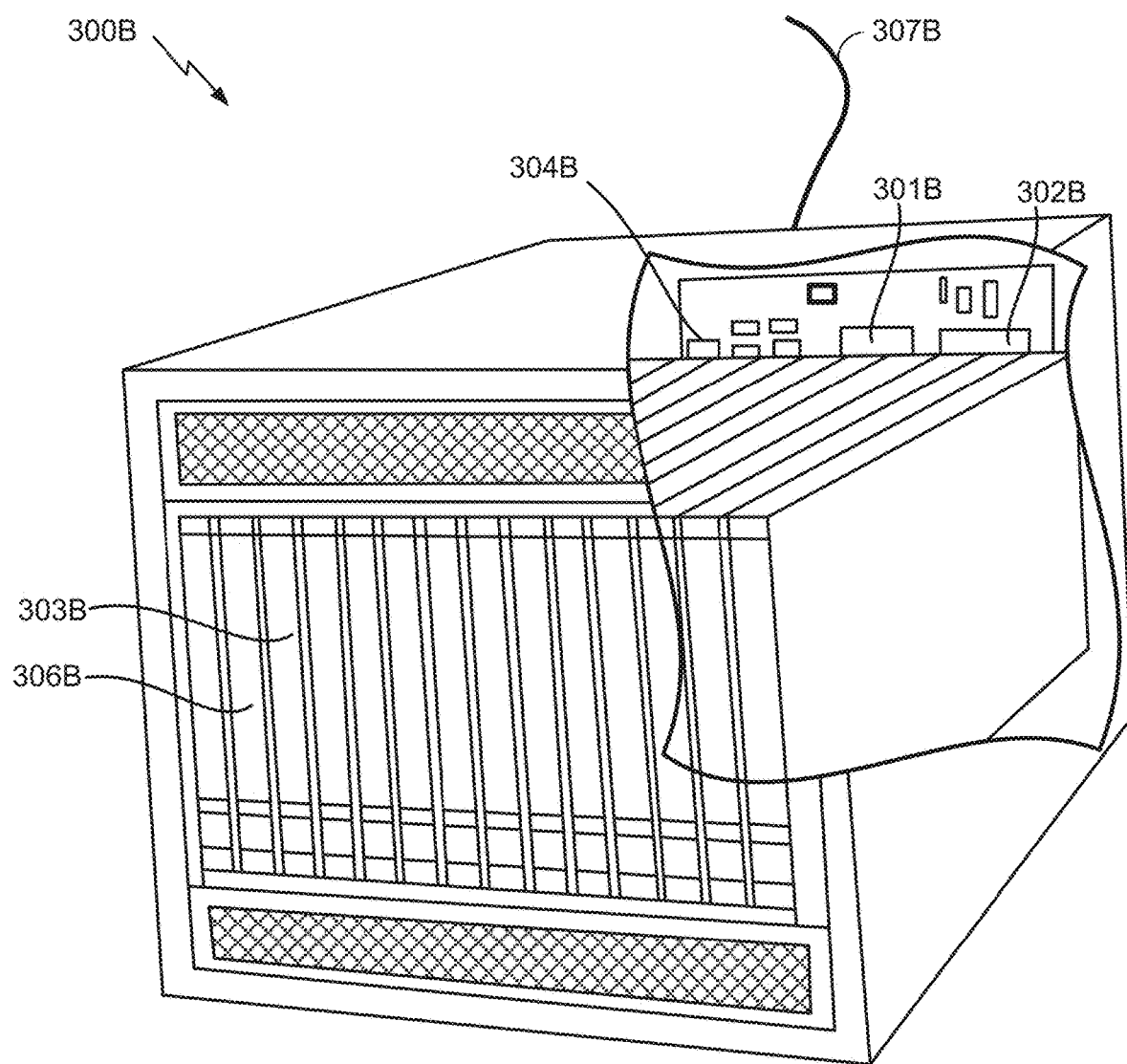
FIG. 3B illustrates an exemplary server according to various aspects.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
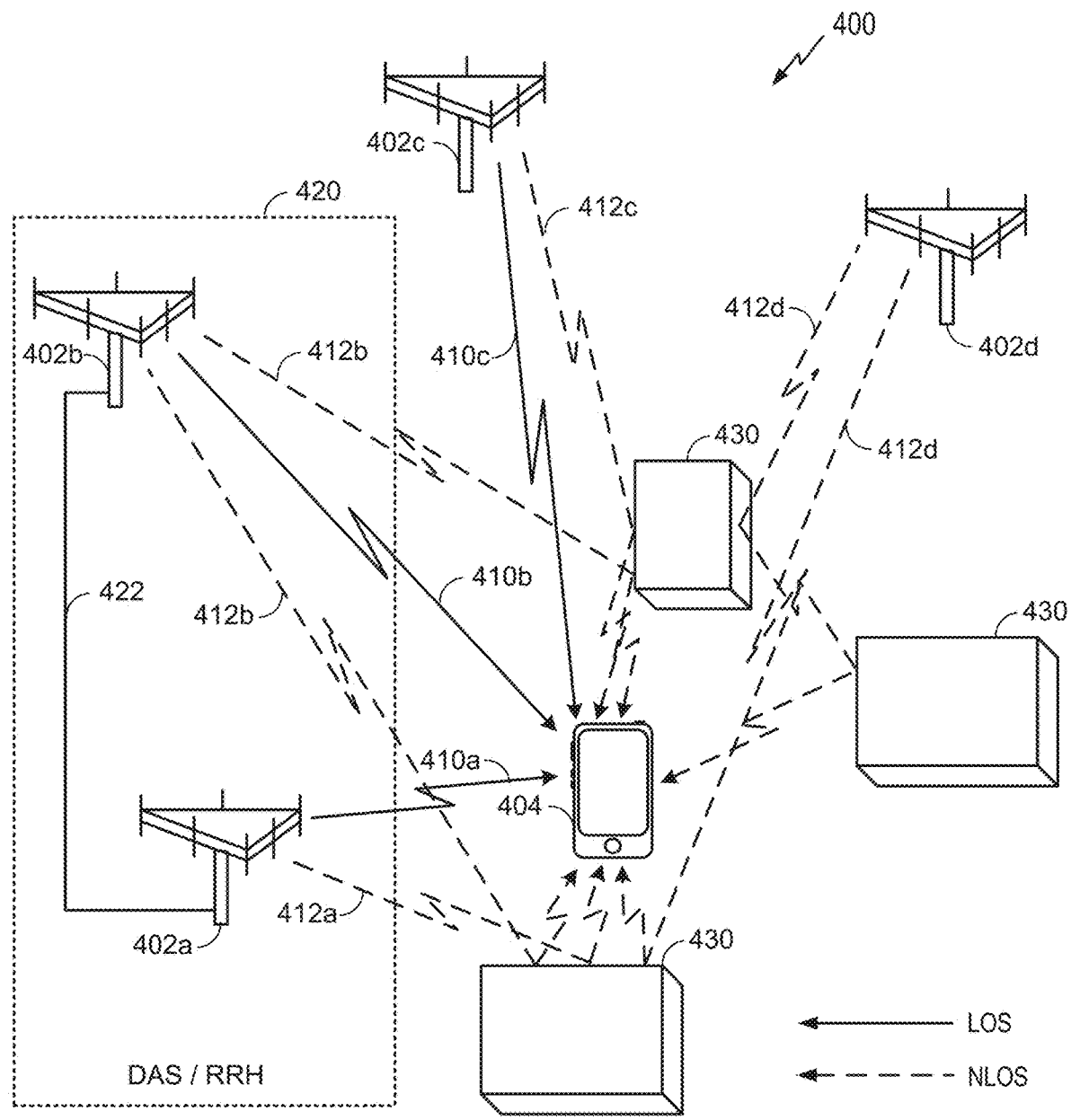
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beam.

While FIG. 4 is described in terms of transmissions from a base station to a UE, it will be appreciated that the downlink RF signal paths described with respect to FIG. 4 are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

OTDOA is a downlink positioning methodology introduced in LTE Rel. 9. OTDOA is a multilateration methodology in which a UE measures the time of arrival (TOA) of signals received from multiple base stations (or eNodeBs). The TOAs of Cell-specific Reference Signals (CRSs) from several neighboring base stations or cells (e.g., eNodeBs) are subtracted from a TOA of a Positioning Reference Signal (PRS) of a reference base station or cell (e.g., eNodeB) to form OTDOAs. In an example, PRSs may be periodically transmitted by base stations or cells (e.g., during positioning occasions that occur aperiodically or at a certain periodicity or interval) and may be implemented as pseudo-random Quadrature Phase Shift Keying (QPSK) sequences that are mapped in diagonal patterns with shifts in frequency and time to avoid collision with cell-specific reference signals. Geometrically, each time (or range) difference determines a hyperbola, and the point at which these hyperbolas intersect is the estimated UE location.

The measurement made by the UE for OTDOA positioning is the Reference Signal Time Difference (RSTD) measurement. The RSTD is the relative timing difference between two cells; namely, the reference cell and a measured neighboring cell. The RSTD measurement is possible on an intra-frequency cell and on an inter-frequency cell. The OTDOA-based may also be implemented in the uplink direction, which is referred to as uplink TDOA (U-TDOA).

Different 3rd Generation Partnership Project (3GPP) Releases specify configurations for a variety of downlink Reference Signals (RSs), including but not limited to PRSs, Narrowband PRSs (NPRSs), CRSs, CSI-RSs, synchronization signals, demodulation reference signals (DMRS), tracking RSs (TRSs), and so on. Newer 3GPP Releases (e.g., for 5G/NR) may modify the configurations for particular RSs relative to corresponding 'legacy' configurations for those RSs from earlier 3GPP Releases.

In a specific example, the NPRS from 3GPP Release 14 may be characterized as a legacy NPRS relative to an enhanced NPRS (eNPRS) newly introduced for 3GPP Release 14 to further improve the NPRS performance. While the eNPRS and the NPRS have different configurations, the eNPRS and NPRS may both be transmitted in certain systems (e.g., to support legacy UEs that only support the NPRS and do not support the eNPRS), in which case the eNPRS may need to be at least partially backward-compatible with the NPRS at least for in-band NB-IoT operation. For example, the NPRS sequence (or transmission schedule) in TS 36.211 Section 10.2.6A.2 of 3GPP Release 14 is as follows:

$$a_{k,l}^{(p)} = r_{l,n_s}(m') \qquad \text{Equation (1)}$$

with m' indicating the PRB locatoin of NB-IoT carrier within the system band of wideband PRS sequence; whereas the eNPRS sequence (or transmission schedule) takes a different PRB of the system band varying frame-by-frame, defined as follows:

$$a_{k,l}^{(p)} = r_{l,n_s}((m'+2\times(n_f \bmod 64)) \bmod 220) \qquad \text{Equation (2)}$$

with $n_f$ as the system frame number (SFN).

In systems where both the NPRS and eNPRS are being transmitted in accordance with their respective transmission schedules, there is a possibility for the NPRS an NPRS-eNPRS collision (or overlap), whereby an NPRS and eNPRS are scheduled for transmission on the same downlink resource(s). Embodiments of the disclosure are thereby directed to mechanisms for managing an overlap between periodic downlink RSs (e.g., NPRS and eNPRS).

Figure 5:
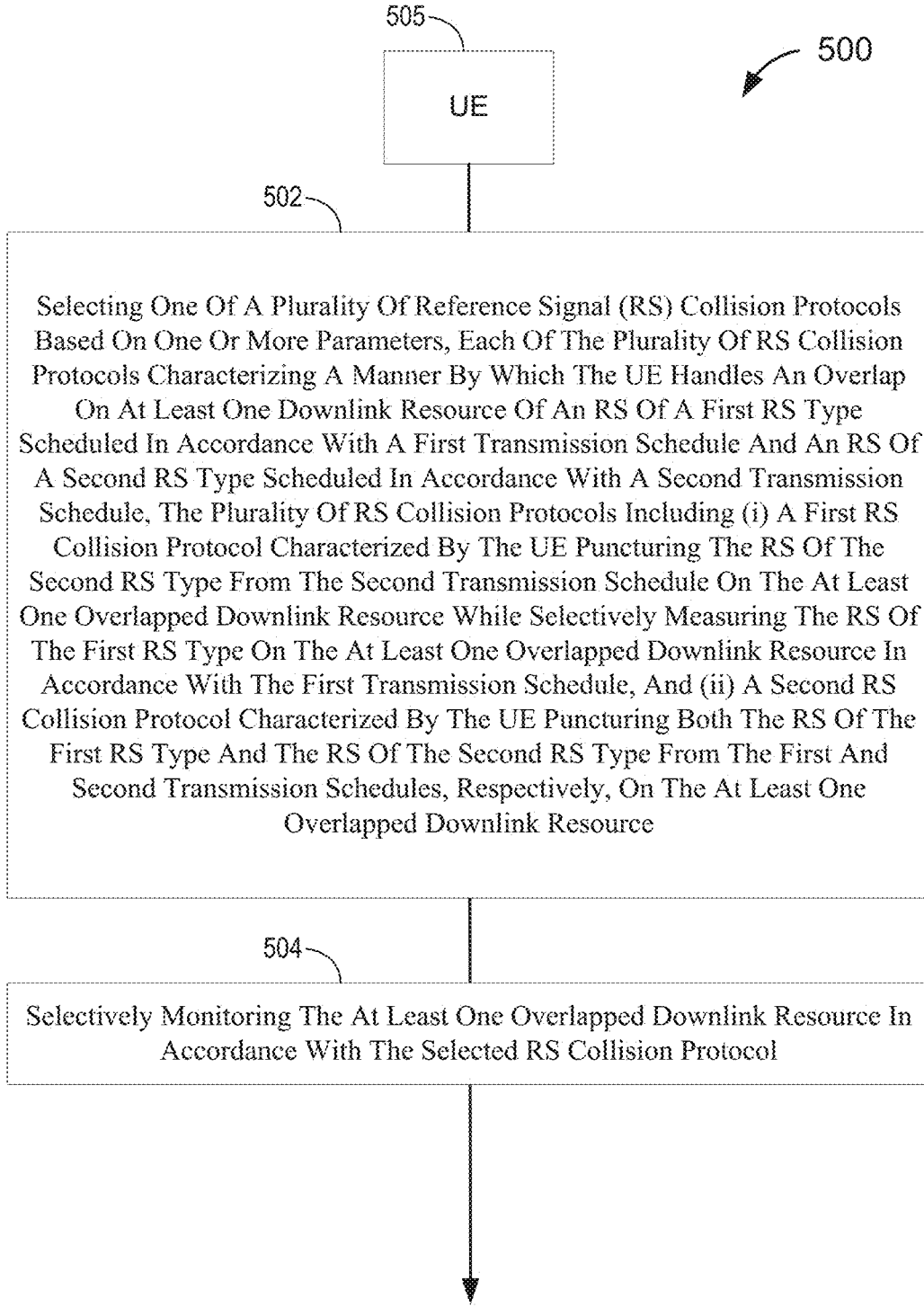
FIG. 5 illustrates an exemplary process of selecting an RS collision protocol at a UE according to an aspect of the disclosure.

FIG. 5 illustrates an exemplary process 500 of selecting an RS collision protocol at a UE according to an aspect of the disclosure. The process 500 of FIG. 5 is performed by a UE 505, which may correspond to any of the above-noted UEs (e.g., UE 240, 350, etc.).

At 502, the UE 505 selects (e.g., controller/processor 359, etc.) one of a plurality of RS collision protocols based on one or more parameters, each of the plurality of RS collision protocols characterizing a manner by which the UE handles an overlap on at least one downlink resource of an RS of a first RS type scheduled in accordance with a first transmission schedule and an RS of a second RS type scheduled in accordance with a second transmission schedule, the plurality of RS collision protocols including (i) a first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, and (ii) a second RS collision protocol characterized by the UE puncturing both the RS of the first RS type and the RS of the second RS type from the first and second transmission schedules, respectively, on the at least one overlapped downlink resource. At 504, the UE 505 selectively monitors (e.g., antenna(s) 352, receiver(s) 354, and/or RX processor 356) the at least one overlapped downlink resource in accordance with the selected RS collision protocol. In an example, at 504, the UE 505 may monitor for the RSs of the first and second RS types on the same RAT (e.g., 5G, NR, etc.) or on different RATs (e.g., 5G and NR).

Referring to FIG. 5, in an example, the first RS collision protocol may be selective in terms of whether the RS of the first RS type on the at least one overlapped downlink resource is measured by the UE based on whether the at least one overlapped downlink resource further overlaps with at least one muting pattern. As will be discussed in more detail below, in the case where the at least one overlapped downlink resource is also muted, the UE's measurement of the RS of the first RS type may be performed if the first transmission schedule is prioritized over the at least one muting pattern, and otherwise is not performed. In this case, the selective monitoring of 504 (i) measures the RS of the first RS type on the at least one overlapped downlink resource in accordance with the first RS collision protocol, or (ii) measures neither RS of the first RS type nor the RS of the second RS type on the at least one overlapped downlink resource in accordance with the second RS collision protocol, or (iii) measures an RS from a neighbor base station on the at least one overlapped downlink resource while muting the measurements of the RS of the first RS type and the RS of the second RS type on the at least one overlapped downlink resource in accordance with either the first RS collision protocol or the second RS collision protocol.

Referring to FIG. 5, in an example, the first transmission schedule includes one or more periodic transmissions of the RS of the first RS type, or one or more aperiodic transmissions of the RS of the first RS type, or a combination thereof. In a further example, the second transmission schedule includes one or more periodic transmissions of the RS of the second RS type, or one or more aperiodic transmissions of the RS of the second RS type, or a combination thereof.

Referring to FIG. 5, the second RS collision protocol essentially treats an RS downlink resource overlap as an error case in the sense that both RS measurements are avoided or discarded. In certain implementations, the second RS collision protocol is simpler for the UE to implement while the first RS collision protocol is more complex or intensive for the UE to implement. So, in one example, the second RS collision protocol will generally be selected at 502 when downlink resource overlaps are expected to be lower (e.g., below a threshold) or even zero (i.e., no overlaps at all, possibly due to an overlap avoidance scheme implemented by the base station), while the first RS collision protocol will generally be selected at 502 when downlink resource overlaps are expected to be higher (e.g., above the threshold).

Referring to FIG. 5, as noted above, the first RS type and/or the second RS type may correspond to any type of downlink RS, including but not limited to PRS, NPRS, CRS, CSI-RS, a synchronization signal, DMRS, or TRS, etc. In a specific example, the first RS type corresponds to an NPRS as defined by 3GPP Release 14 in earlier stage, and the second RS type corresponds to an NPRS as defined by 3GPP Release 14 for further enhancement. In a further example, in addition to choosing the RS of the first RS type on the at least one overlapped downlink resource, additional assumption that the RSs from the first and/or second transmission are not scheduled may be implemented in accordance with a muting pattern to measure inter-cell interference. In other words, the muting pattern is aligned with a transmission pattern of a base station that is separate from a base station serving the UE so as to measure the RS based on the other base station's transmission pattern.

Referring to FIG. 5, in an example, the one or more parameters that factor into whether the first or second RS collision protocol is selected at 502 may include one or more of wherein the one or more parameters include a periodicity parameter, ON/OFF bitmap parameter (i.e., valid subframes for NPRS/eNPRS mapping), a sequence ID parameter (which is the cell ID or virtual cell ID, determining the resource element position within a transmission unit, e.g., a resource block), a carrier frequency parameter (e.g., standalone, guard-band or in-band carrier frequency, whereby RS transmissions on different carrier frequencies will not result in an overlap or collision), an occasion length parameter (or 'duration'), an offset parameter and/or a muting parameter associated with RS transmissions as defined by the first and/or second transmission schedules.

In a first example, the selection of 502 may be based on a periodicity parameter associated with the first and second transmission schedules. In a further example, the periodicity parameter may indicate a relative periodicity of RS transmissions in the first and second transmission schedules. As used herein, "periodicity" refers to the interval between successive transmissions of an RS in a transmission schedule. Table 1 (below) represents an NPRS-specific implementation example of alternative RS collision protocol selection options for selecting between the first RS collision protocol ("RS1") and the second RS collision protocol ("RS2"). In Table 1 (below), higher periodicity indicates a longer interval between periodic RS transmissions (and hence, a lower frequency of RS transmission), and lower periodicity indicates a shorter interval between periodic RS transmissions (and hence, a higher frequency of RS transmission).

TABLE 1

| | RS Collision Protocol Options | | |
| --- | --- | --- | --- |
| | Periodicity_NPRS < Periodicity_eNPRS | Periodicity_NPRS = Periodicity_eNPRS | Periodicity_NPRS > Periodicity_eNPRS |
| Option 1 | RS2 | RS2 | RS1 |
| Option 2 | RS1 | RS2 | RS1 |

TABLE 1-continued

| | RS Collision Protocol Options | | |
|---|---|---|---|
| | Periodicity_NPRS < Periodicity_eNPRS | Periodicity_NPRS = Periodicity_eNPRS | Periodicity_NPRS > Periodicity_eNPRS |
| Option 3 | RS2 | RS2 | RS1 if Periodicity_eNPRS < P0, Otherwise RS2 |
| Option 4 | RS1 if Periodicity_eNPRS < P0', Otherwise RS2 | RS2 | RS1 if Periodicity_eNPRS < P0, Otherwise RS2 |

Referring to Table 1, P0 and P0' denote periodicity thresholds that may be used in conjunction with the periodicity comparison between the NPRS periodicity ("Periodicity_NPRS") and the eNPRS periodicity ("Periodicity_eNPRS"). In an example, P0 and P0' may be pre-defined, or alternatively may be configured via higher-layer signaling (e.g., RRC signaling as part of RRC configuration). In one example, P0 and P0' may be the same, but in other implementations P0 and P0' may be different. In a specific example, P0 and P0' may be set to 40 ms, 80 ms, and so on.

In a second example, the selection of 502 may be based on an offset parameter and a duration parameter associated with the first and second transmission schedules. In an example, the offset parameter may indicate a time in which a respective transmission is offset from the starting subframe derived from subframe offset ratio within the periodicity, e.g., $T_{offset} = \alpha T$ with periodicity T and $\alpha = \{0, 1/8, 2/8, \ldots, 7/8\}$. In a further example, the duration parameter, defined as a number of consecutive valid subframes for RS transmission in one RS occasion, corresponds to an NPRS duration, an eNPRS duration, or both. Table 2 (below) represents an NPRS-specific implementation example of alternative RS collision protocol selection options for selecting between the first RS collision protocol ("RS1") and the second RS collision protocol ("RS2"). In Table 2, Offset_eNPRS being greater than or equal Offset_NPRS+Duration_NPRS means that the eNPRS does not start until after the NPRS is over, i.e., no overlap.

TABLE 2

| | RS Collision Protocol Options | | |
|---|---|---|---|
| | Offset_NPRS + Duration_NPRS < Offset_eNPRS | Offset_NPRS + Duration_NPRS = Offset_eNPRS | Offset_NPRS + Duration_NPRS > Offset_eNPRS |
| Option 1 | RS2 | RS2 | RS1 |
| Option 2 | RS2 | RS2 | RS1 if Offset_eNPRS + Duration_eNPRS >> β(Offset_NPRS + Duration_NPRS); Otherwise, RS2 |

Referring to Table 2, β denotes a weighting factor for comparison. In an example, β may be pre-defined, or alternatively may be configured via higher-layer signaling (e.g., RRC signaling as part of RRC configuration). In a specific example, β may be set to 1, 3/2, 2, etc.

In a second example, the selection of 502 may be based on at least one muting pattern associated with the first and second transmission schedules. For example, if a relatively high number (e.g., above a threshold) of downlink resources that overlap with the first and second transmission schedules also overlap with at least one muting pattern, then the UE may select the second RS collision protocol at 502 of FIG. 5. On the other hand, if a relatively lower number (e.g., below the threshold) of downlink resources that overlap with the first and second transmission schedules also overlap with the at least one muting pattern, then the UE may select the second RS collision protocol at 502 of FIG. 5.

Figure 6:
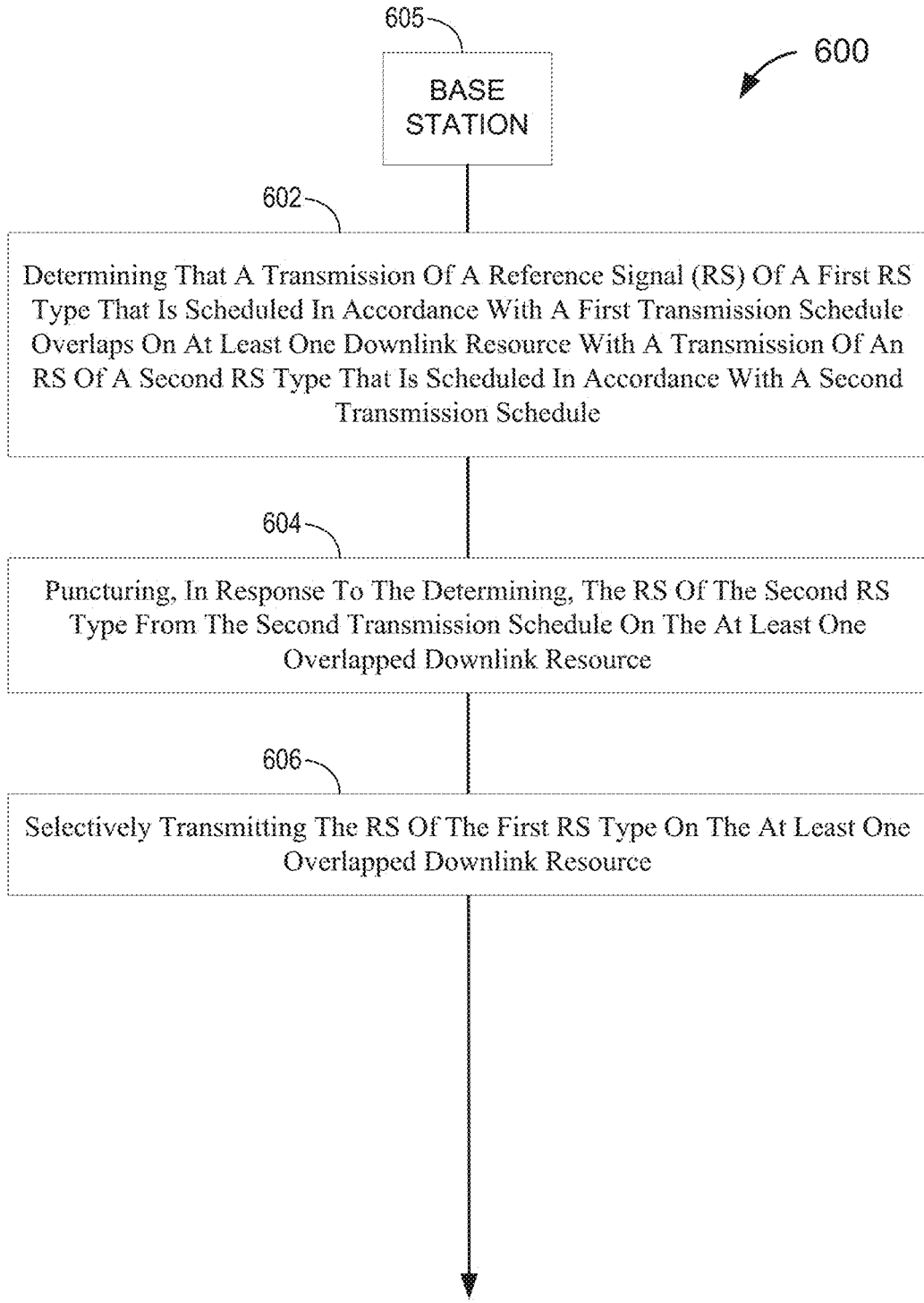
FIG. 6 illustrates an exemplary process of puncturing downlink RS resource(s) according to an aspect of the disclosure.

FIG. 6 illustrates an exemplary process 600 of puncturing downlink RS resource(s) according to an aspect of the disclosure. The process 600 of FIG. 6 is performed by a base station 605. In an example, the base station 605 may correspond to gNB 222, eNB 224, base station 310, etc.

At 602, the base station 605 (e.g., controller/processor 375, processor 301B, etc.) determines a transmission of an RS of a first RS type that is scheduled in accordance with a first transmission schedule overlaps on at least one downlink resource with a transmission of an RS of a second RS type that is scheduled in accordance with a second transmission schedule. At 604, the base station 605 (e.g., controller/processor 375, processor 301B, etc.) punctures, in response to the determination of 602, the RS of the second RS type from the second transmission schedule on the at least one overlapped downlink resource. At 606, the base station 605 (e.g., controller/processor 375, processor 301B, etc.) selectively transmits the RS of the first RS type on the at least one overlapped downlink resource. In an example, the transmission at 606 may be selective in implementations where the at least one overlapped downlink resource further overlaps with at least one muting pattern. As will be discussed in more detail below, in the case where the at least one overlapped downlink resource is also muted, the transmission of the RS of the first RS type at 606 may be performed if the first transmission schedule is prioritized over the at least one muting pattern, and otherwise is not performed.

Referring to FIG. 6, as noted above, the first RS type and/or the second RS type may correspond to any type of downlink RS, including but not limited to PRS, NPRS, CRS, CSI-RS, a synchronization signal, a DMRS, or a TRS. In a specific example, the first RS type corresponds to an NPRS as defined by 3GPP Release 14 in earlier stage, and the second RS type corresponds to an enhanced NPRS as defined by 3GPP Release 14 for further enhancement. In a further example, in addition to puncturing the RS of the second RS type on the at least one overlapped downlink resource, additional puncturing of the RS of the second RS type from the second transmission schedule may be implemented in accordance with a muting pattern to measure inter-cell interference. In other words, the muting pattern is aligned with a transmission pattern (e.g., NPRS/eNPRS transmission schedules) of another base station that is separate from the base station 605 so as to measure the RS based on the other base station's transmission pattern.

Referring to FIGS. 5-6, while the term 'puncturing' is used with respect to both the UE 505 and the base station 605, the type of puncturing is distinct. In the process 500 of FIG. 5, RS puncturing refers to removal of a scheduled RS from an associated transmission schedule so that the UE 505 is able to recognize that the associated overlapped downlink resource does not transport the punctured RS, and hence refrain from monitoring the eNPRS on that overlapped downlink resource. However, in the process of FIG. 6, puncturing of the RS at 604 removes that RS from a transmission schedule (or queue) at the base station 605, such that the punctured RS is not transmitted at all. Hence, depending on whether the term 'puncturing' is used in a UE context or a base station context, puncturing may refer to refraining from scheduled monitoring/reception of an RS or refraining from performing a scheduled transmission of an RS.

Referring to FIG. 5-6, while certain embodiments of the disclosure relate to RSs that are transmitted on a periodic basis, other embodiments may be directed to periodic-aperiodic RSs collision with a first aperiodic RS of a first RS type and a second periodic RS of a second RS type. For example, if aperiodic PRS (A-PRS) is introduced, the aperiodic NPRS is prioritized over an aperiodic PRS if overlapping scheduling is allowed. In a further example, the RS of the first RS type and the RS of the second RS type may be carried by different radio access technologies (RATs), e.g., LTE PRS vs. NR PRS. For example, to avoid negative impact on legacy LTE UEs, the LTE-PRS is prioritized than NR-PRS if overlapping scheduling is allowed.

Figure 7:
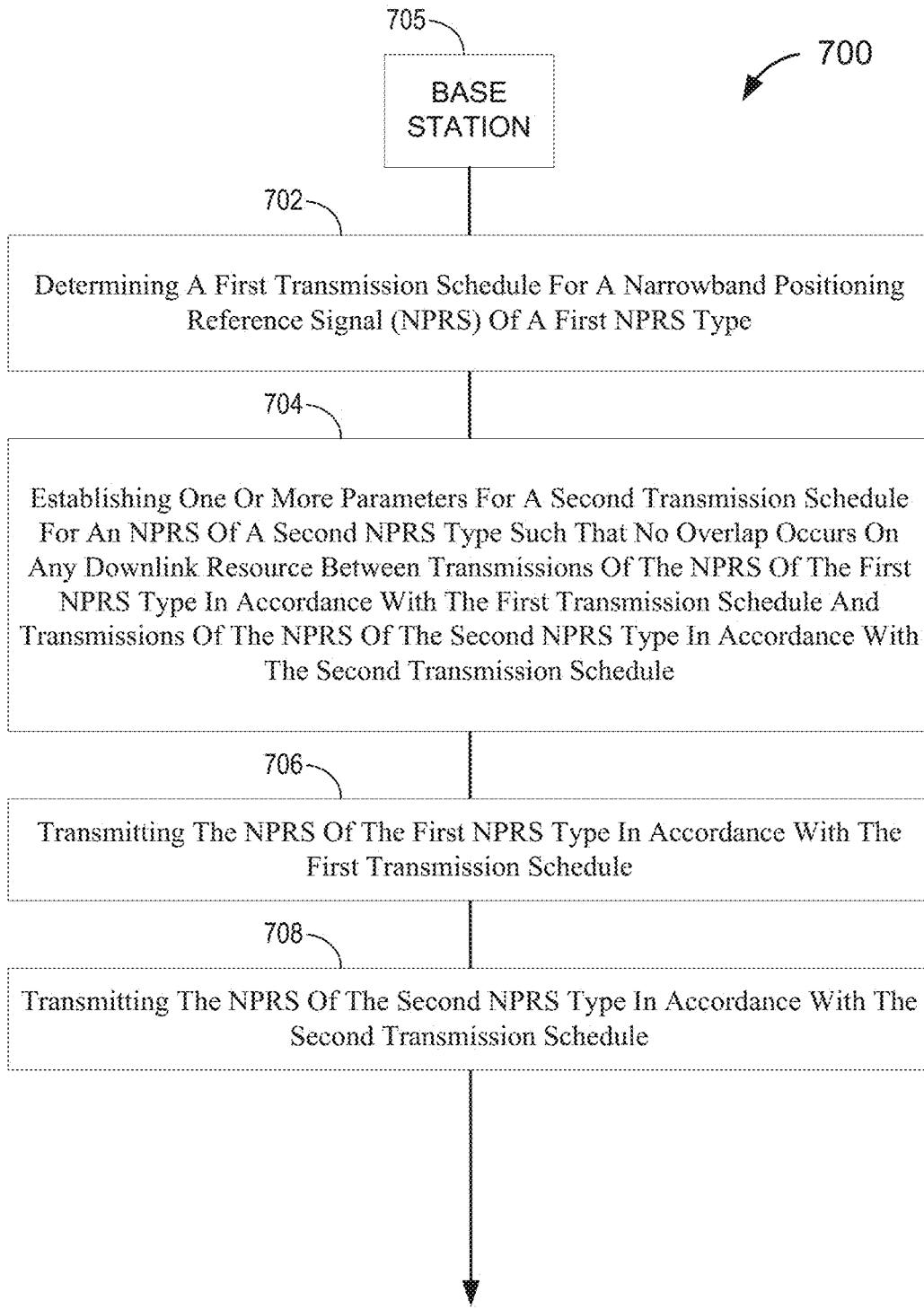
FIG. 7 illustrates an exemplary process of establishing a NPRS transmission schedule according to an aspect of the disclosure.

FIG. 7 illustrates an exemplary process 700 of establishing a NPRS transmission schedule according to an aspect of the disclosure. The process 700 of FIG. 7 is performed by a base station 705. In an example, the base station 705 may correspond to gNB 222, eNB 224, base station 310, etc. While the processes of FIGS. 5-6 are described with respect to any RS type (e.g., PRS, NPRS, CRS, CSI-RS, DMRS, TRS, etc.), the process of FIG. 7 is described more specifically with respect to NPRS.

At 702, the base station 705 (e.g., controller/processor 375, processor 301B, etc.) determines a first transmission schedule for a NPRS of a first NPRS type. At 704, the base station 705 (e.g., controller/processor 375, processor 301B, etc.) establishes one or more parameters for a second transmission schedule for an NPRS of a second NPRS type such that no overlap occurs on any downlink resource between transmissions of the NPRS of the first NPRS type in accordance with the first transmission schedule and transmissions of the NPRS of the second NPRS type in accordance with the second transmission schedule. At 706, the base station 705 (e.g., controller/processor 375, processor 301B, etc.) transmits the NPRS of the first NPRS type in accordance with the first transmission schedule. At 708, the base station 705 (e.g., controller/processor 375, processor 301B, etc.) transmits the NPRS of the second NPRS type in accordance with the second transmission schedule.

Referring to FIG. 7, the one or more parameters that are established for the second transmission schedule may include a periodicity of the second transmission schedule. For example, the periodicity of the second transmission schedule may be set equal to the periodicity of the first transmission schedule to avoid any NPRS collisions. In a further example, the first NPRS type corresponds to an NPRS as defined by 3GPP Release 14 in earlier stage, and the second NPRS type corresponds to an enhanced NPRS as defined by 3GPP Release 14 for further enhancement.

Referring to FIGS. 5-7, in an example, the NPRS and eNPRS may be configured with the same sequence ID. For example, the SMLC may configure the same sequence ID for the NPRS and the eNPRS so as to use the same resource element in a configured subframe. In this case, with respect to an overlapped downlink resource, the base station transmits the NPRS with the shared sequence ID on the overlapped downlink resource, and the UE in turn monitors the NPRS with the shared sequence ID on the overlapped downlink resource. In an example, the NPRS and eNPRS may be configured with the same carrier frequency. For example, the SMLC may configure the same in-band carrier frequency for the NPRS and the eNPRS so as to use the same resource element in a configured subframe. In this case, with respect to an overlapped downlink resource, the base station transmits the NPRS with the shared in-band carrier frequency on the overlapped downlink resource, and the UE in turn monitors the NPRS with the shared in-band carrier frequency on the overlapped downlink resource.

Referring to FIGS. 5-7, in an example, the NPRS and/or eNPRS transmission schedules may be punctured in accordance with a muting pattern (e.g., to measure RS at a neighbor base station). It is possible that an overlapped NPRS/eNPRS downlink resource is part of the muting pattern. In an example, the base station would puncture both the NPRS and the eNPRS on the overlapped and muted downlink resourced from transmission. Also, the UE may monitor the neighbor base station's NPRS and/or eNPRS on the overlapped and muted downlink resource. In a further example, the SMLC may align the NPRS/eNPRS muting pattern for each cell to the extent possible with the NPRS and/or eNPRS transmission schedules of neighboring cells.

In an example, in the collided resources, both the base station and UE use the signal transmission and muting based on NPRS configuration in the collided or overlapped downlink resource(s). In other words, the UE may prioritize the NPRS configurations than that of eNPRS. In one example, if the overlapped downlink resource(s) are muted by NPRS configuration (or NPRS-specific muting pattern) but not by eNPRS configuration (or eNPRS-specific muting pattern), the base station will not send NPRS and eNPRS and the UE measures the NPRS of neighbor cell(s) instead of the base station (i.e., the serving cell of the UE) on the overlapped downlink resource(s). On the other hand, in another example, if the overlapped downlink resource(s) are muted by eNPRS configuration but not by NPRS configuration, the base station will send the NPRS on the overlapped downlink resource(s) and the UE measures the NPRS of the base station (i.e., its serving cell) on the overlapped downlink resource(s).

Alternatively, both the base station and UE may prioritize muting configuration in the overlapped downlink resource(s) and use NPRS for transmission only in the unmuted overlapped downlink resource(s). In this case, the overlapped downlink resource(s) are muted by at least one of NPRS configuration and eNPRS configuration, the base station will not send NPRS and eNPRS, and the UE measures the NPRS or eNPRS of neighbor cell(s) instead of the base station (i.e., the serving cell of the UE) on the overlapped downlink resource(s). On the other hand, in another example, if the overlapped resources are not muted by both NPRS and eNPRS configurations, the base station will send NPRS on the overlapped downlink resource(s) and the UE measures the NPRS of the base station (i.e., its serving cell) on the overlapped downlink resource(s).

FIGS. 8-13 illustrate exemplary NPRS/eNPRS transmission sequences in accordance with aspects of the disclosure. The exemplary NPRS/eNPRS transmission sequences described with respect to FIGS. 8-13 represent example implementations whereby the NPRS/eNPRS transmission schedules are periodic transmission schedules with the NPRS and eNPRS being scheduled for transmission in accordance with a defined periodicity denoted as Periodicity_NPRS or Periodicity sNPRS, respectively. However, it will be appreciated that other embodiments can include aperiodic NPRS/eNPRS transmissions and/or transmission schedules that include a combination of periodic and aperiodic NPRS/eNPRS transmissions.

Figure 8:
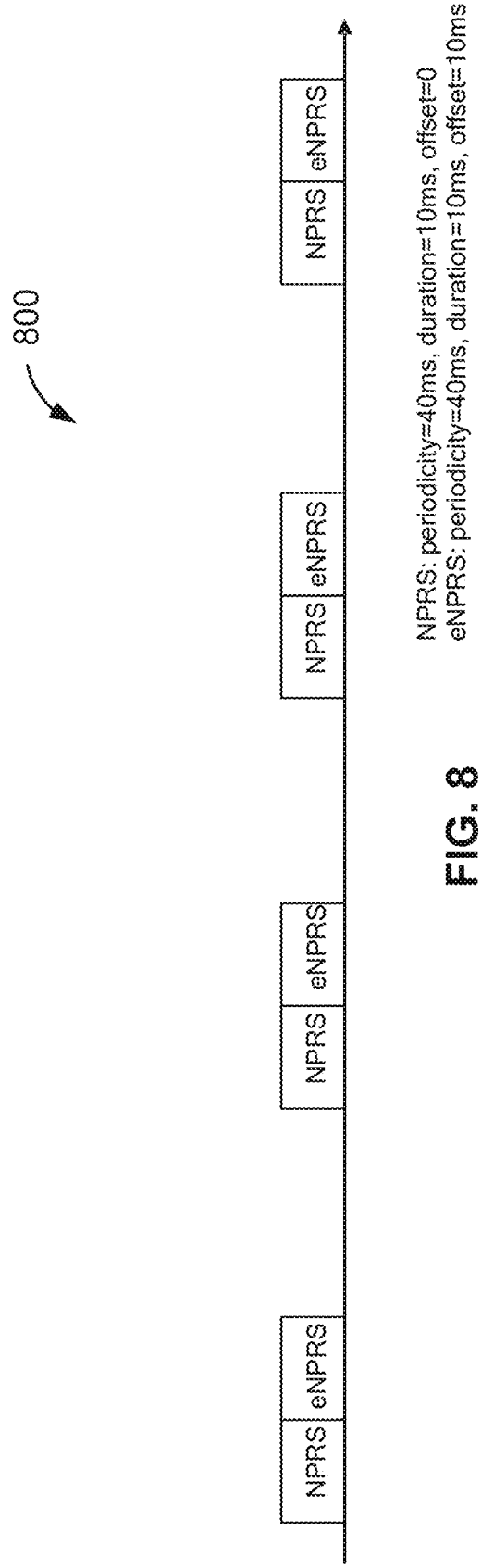
FIGS. 8-13 illustrate exemplary NPRS/eNPRS transmission sequences in accordance with aspects of the disclosure.

FIG. 8 illustrates a NPRS/eNPRS transmission sequence 800 in accordance with an aspect of the disclosure. Referring to the NPRS/eNPRS transmission sequence 800 depicted in FIG. 8, in accordance with 702-704 of FIG. 7, Periodicity_NPRS (e.g., 40 ms) is set equal to Periodicity eNPRS (e.g., 40 ms) with the same duration (e.g., 10 ms) and a different subframe offset (e.g., 0 ms for NPRS and 10 ms for eNPRS), such that a base station will send each periodic NPRS and eNPRS without any NPRS/eNPRS overlap on any downlink resource (or NPRS/eNPRS 'occasion'). Hence, no puncturing is implemented for the NPRS/eNPRS transmission sequence 800.

In an example, a Serving Mobile Location Center (SMLC) may provide correct assistance data (AD) to notify the UE of the non-colliding NPRS/eNPRS configuration (e.g., eNPRS Offset≥NPRS Offset+NPRS_Duration). The AD can then be used at least in part to cause the UE to select the second RS collision protocol. As noted above, the second RS collision protocol essentially treats an RS downlink resource overlap as an error case, which is simpler for the UE to implement and the more complex or intensive first RS collision protocol need not be used for scenarios where overlaps in RS scheduling are actively avoided by the base station. For example, the UE may select RS2 because Periodicity_NPRS=Periodicity eNPRS pursuant to any of Options 1-4 in Table 1. In another example, the UE may select RS2 because Offset_NPRS+ Duration_NPRS=Offset_eNPRS pursuant to either Option 1 or Option 2 in Table 2.

Figure 9:
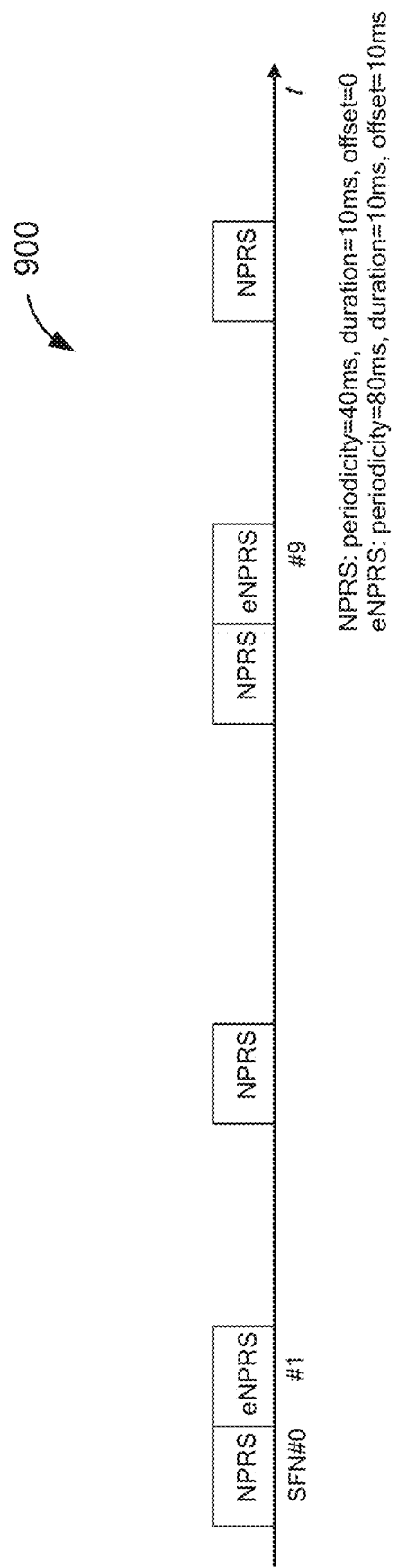

FIG. 9 illustrates a NPRS/eNPRS transmission sequence 900 in accordance with another aspect of the disclosure. Referring to the NPRS/eNPRS transmission sequence 900 depicted in FIG. 9, in accordance with 702-704 of FIG. 7, Periodicity_NPRS (e.g., 40 ms) is set lower than Periodicity_eNPRS (e.g., 80 ms) with the same duration (e.g., 10 ms) and a different subframe offset (e.g., 0 ms for NPRS and 10 ms for eNPRS), such that a base station will send each periodic NPRS and eNPRS without any NPRS/eNPRS overlap on any downlink resource (or NPRS/eNPRS 'occasion'). Hence, no puncturing is implemented for the NPRS/eNPRS transmission sequence 900. Similar to FIG. 8, in an example, the UE determines that the periodic NPRS/eNPRS resources do not overlap (e.g., via AD from the SMLC), and the UE thereby selects the second RS collision protocol at 502 of FIG. 5. For example, the UE may select RS2 because Periodicity_NPRS<Periodicity eNPRS pursuant to Options 1 and 3 and (possibly) Option 4 in Table 1. Alternatively, the UE may select RS1 because Periodicity_NPRS<Periodicity eNPRS pursuant to Option 3 and (possibly) Option 4 in Table 1. In another example, the UE may select RS2 because Offset_NPRS+Duration_NPRS<Offset_eNPRS pursuant to either Option 1 or Option 2 in Table 2.

Figure 10:
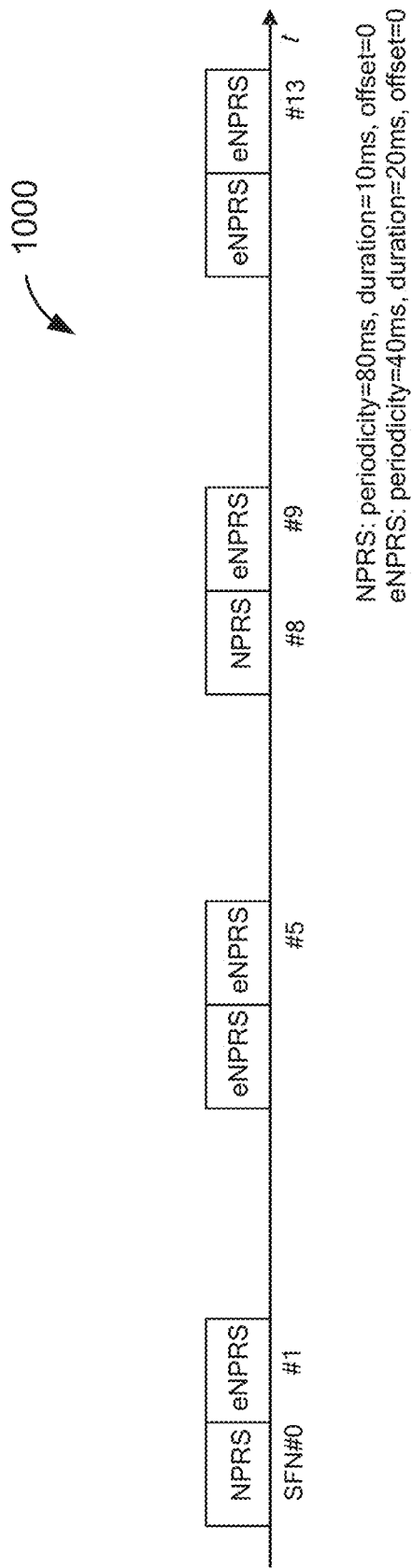

FIG. 10 illustrates a NPRS/eNPRS transmission sequence 1000 in accordance with another aspect of the disclosure. Referring to the NPRS/eNPRS transmission sequence 1000 depicted in FIG. 10, Periodicity_NPRS (e.g., 80 ms) is set higher than Periodicity_eNPRS (e.g., 40 ms) with different durations (e.g., 10 ms for NPRS and 20 ms for eNPRS) and the same subframe offset (e.g., 0 ms). In this case, the periodic transmission schedules for NPRS and eNPRS result in an overlap at SFN#0 and SFN#5. Hence, pursuant to the processes of FIGS. 5-6, the eNPRS scheduled for transmission at each of SFN#0 and SFN#5 is punctured and replaced with NPRS. In one example, the UE recognizes the periodic NPRS/eNPRS resource overlaps (e.g., via AD from the SMLC), and the UE thereby selects the first RS collision protocol at 502 of FIG. 5. For example, the UE may select RS1 because Periodicity_NPRS>Periodicity_eNPRS pursuant to Options 1-2 and (possibly) Options 3-4 in Table 1. Alternatively, the UE may select RS2 because Periodicity_NPRS>Periodicity_eNPRS depending on the value of P0 pursuant to Options 1-4 in Table 1. In another example, the UE may select RS1 because Offset_NPRS+ Duration_NPRS>Offset_eNPRS pursuant to Option 1 and (possibly) Option 2 in Table 2. Alternatively, the UE may select RS2 because Offset_NPRS+ Duration_NPRS>Offset_eNPRS depending on the value of β pursuant to Option 2 in Table 2.

Figure 11:
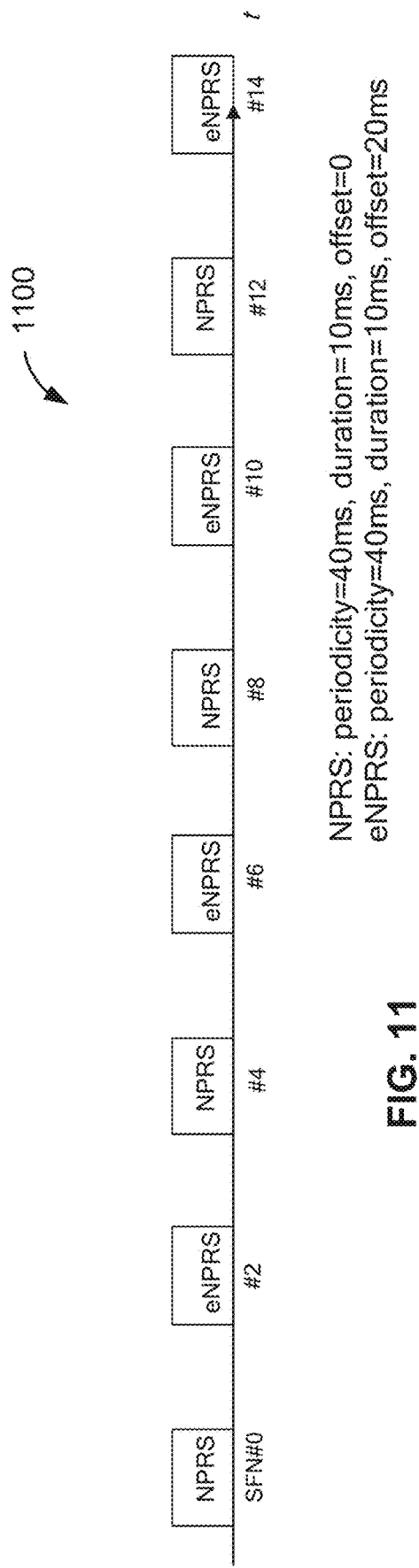

FIG. 11 illustrates a NPRS/eNPRS transmission sequence 1100 in accordance with another aspect of the disclosure. Referring to the NPRS/eNPRS transmission sequence 1100 depicted in FIG. 11, in accordance with 702-704 of FIG. 7, Periodicity_NPRS (e.g., 40 ms) is set equal to Periodicity_ eNPRS (e.g., 40 ms) with the same duration (e.g., 10 ms) and a different subframe offset (e.g., 0 ms for NPRS and 20 ms for eNPRS), such that a base station will send each periodic NPRS and eNPRS without any NPRS/eNPRS overlap on any downlink resource (or NPRS/eNPRS 'occasion'). Hence, no puncturing is implemented for the NPRS/eNPRS transmission sequence 1100. In one example, the UE recognizes the periodic NPRS/eNPRS resources do not overlap (e.g., via AD from the SMLC), and the UE thereby selects the second RS collision protocol at 502 of FIG. 5. For example, the UE may select RS2 because Periodicity_NPRS=Periodicity_eNPRS pursuant to any of Options 1-4 in Table 1. In another example, the UE may select RS2 because Offset_NPRS+ Duration_NPRS<Offset_eNPRS pursuant to either Option 1 or Option 2 in Table 2.

Figure 12:
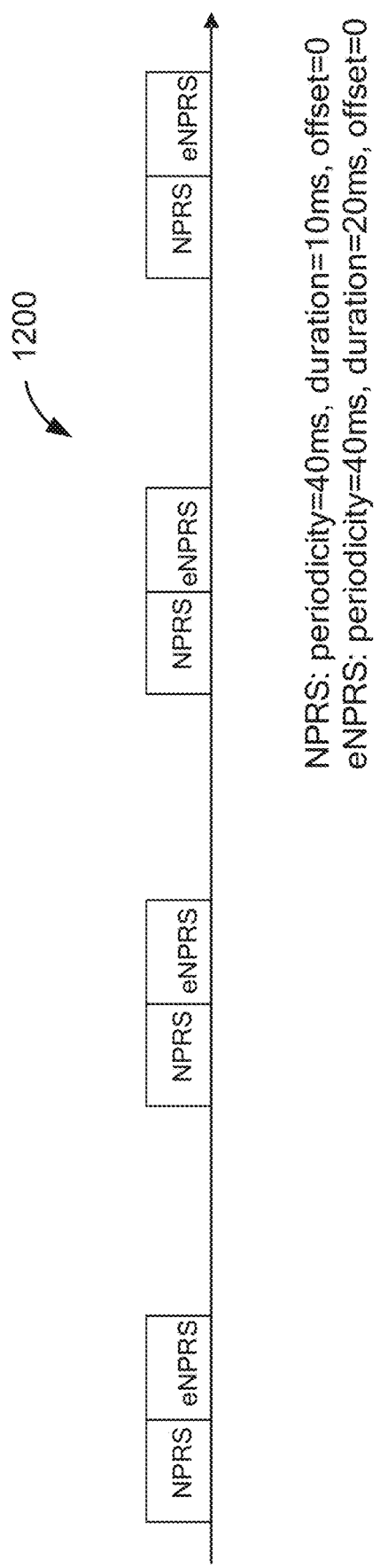

FIG. 12 illustrates a NPRS/eNPRS transmission sequence 1200 in accordance with another aspect of the disclosure. Referring to the NPRS/eNPRS transmission sequence 1200 depicted in FIG. 12, in accordance with 702-704 of FIG. 7, Periodicity_NPRS (e.g., 40 ms) is set equal to Periodicity eNPRS (e.g., 40 ms) with different durations (e.g., 10 ms for NPRS and 20 ms for eNPRS) and different offsets (e.g., 0 ms for NPRS and 10 ms for eNPRS), such that a base station will send each periodic NPRS and eNPRS without any NPRS/eNPRS overlap on any downlink resource (or NPRS/ eNPRS 'occasion'). Hence, no puncturing is implemented for the NPRS/eNPRS transmission sequence 1200. In one example, the UE recognizes the periodic NPRS/eNPRS resources do not overlap (e.g., via AD from the SMLC), and the UE thereby selects the second RS collision protocol at 502 of FIG. 5. For example, the UE may select RS2 because Periodicity_NPRS=Periodicity eNPRS pursuant to any of Options 1-4 in Table 1. In another example, the UE may select RS2 because Offset_NPRS+Duration_NPRS<Offset_eNPRS pursuant to either Option 1 or Option 2 in Table 2.

Figure 13:
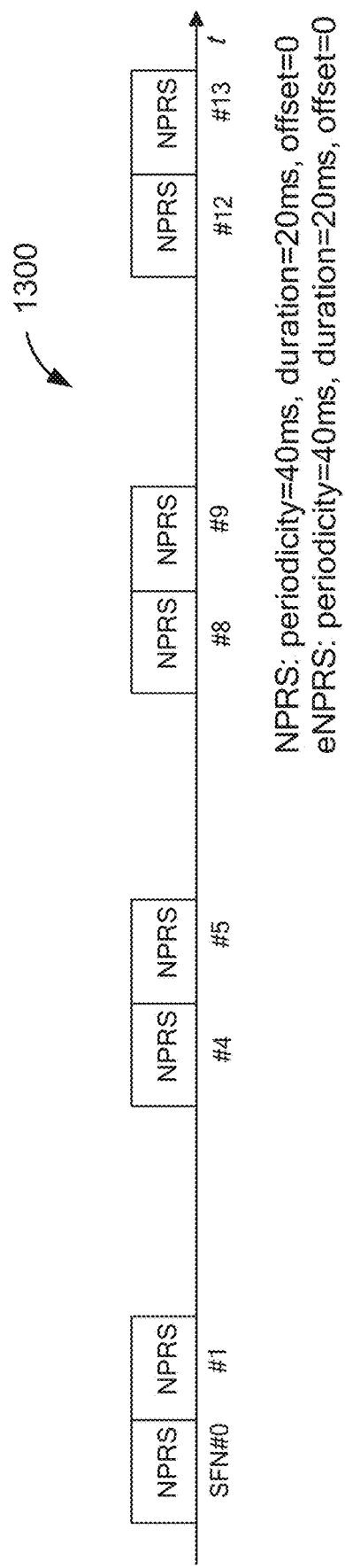

FIG. 13 illustrates a NPRS/eNPRS transmission sequence 1300 in accordance with another aspect of the disclosure. Referring to the NPRS/eNPRS transmission sequence 1300 depicted in FIG. 13, Periodicity_NPRS (e.g., 40 ms) is set equal Periodicity_eNPRS (e.g., 40 ms) with the same duration (e.g., 20 ms) and the same subframe offset (e.g., 0 ms). In this case, the periodic transmission schedules for NPRS and eNPRS are completely overlapping, i.e., at each of SFN#0, SFN#1, SFN#4, SFN#5, SFN#8, SFN#9, SFN#12 and SFN#13. Hence, pursuant to the processes of FIGS. 5-6, the eNPRS scheduled for transmission at each of SFN#0, SFN#1, SFN#4, SFN#5, SFN#8, SFN#9, SFN#12 and SFN#13 is punctured and replaced with NPRS. In one example, the UE recognizes the periodic NPRS/eNPRS resource overlaps (e.g., via AD from the SMLC), and the UE thereby selects the first RS collision protocol at 502 of FIG. 5. For example, the UE may select RS1 because Offset_NPRS+Duration_NPRS>Offset_eNPRS pursuant to Option 1 and (possibly) Option 2 in Table 2. Alternatively, the UE may select RS2 because Offset_NPRS+Duration_NPRS>Offset_eNPRS depending on the value of β pursuant to Option 2 in Table 2. By contrast, in accordance with Table 1, the UE would select RS2 because Periodicity_NPRS=Periodicity_eNPRS pursuant to any of Options 1-4 (no overriding despite the complete eNPRS/NPRS downlink resource overlap).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a user equipment (UE), comprising:
selecting a first Reference Signal (RS) collision protocol based on one or more parameters, the first RS collision protocol characterizing a manner by which the UE handles an overlap on at least one downlink resource of an RS of a first RS type scheduled in accordance with a first transmission schedule and an RS of a second RS type scheduled in accordance with a second transmission schedule, the first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, wherein the one or more parameters comprise one or more resource configuration parameters associated with the first transmission schedule, the second transmission schedule, or a combination thereof; and
monitoring the at least one overlapped downlink resource in accordance with the selected RS collision protocol.

2. The method of claim 1,
wherein the first transmission schedule includes one or more periodic transmissions of the RS of the first RS type, or
wherein the first transmission schedule includes one or more aperiodic transmissions of the RS of the first RS type, or
wherein the second transmission schedule includes one or more periodic transmissions of the RS of the second RS type, or
wherein the second transmission schedule includes one or more aperiodic transmissions of the RS of the second RS type, or
any combination thereof.

3. The method of claim 1, wherein the first RS type and/or the second RS type correspond to a Positioning Reference Signal (PRS), a Narrowband Positioning Reference Signal (NPRS), a Cell-specific Reference Signal (CRS), a Channel State Information (CSI) RS, a synchronization signal, a Demodulation Reference Signal (DMRS), or a Tracking Reference Signal (TRS).

4. The method of claim 3,
wherein the first RS type corresponds to an NPRS as defined by 3rd Generation Partnership Project (3GPP) Release 14, and
wherein the second RS type corresponds to an enhanced NPRS as defined by 3GPP Release 14.

5. The method of claim 1,
wherein the RS of the first RS type is scheduled in accordance with the first transmission schedule for transmission on a first Radio Access Technology (RAT), and
wherein the RS of the second RS type is scheduled in accordance with the second transmission schedule for transmission on a second RAT.

6. The method of claim 1, wherein the one or more parameters include one or more of a periodicity parameter, an ON/OFF bitmap parameter, a carrier frequency parameter, an occasion length parameter, an offset parameter and/or a muting parameter associated with RS transmissions as defined by the transmission schedule or the second transmission schedule or both transmission schedules.

7. The method of claim 6,
wherein the one or more parameters include the periodicity parameter,
wherein selecting selects the first RS collision protocol based on a periodicity of the first RS type not being equal to a periodicity of the second RS type.

8. The method of claim 1, further comprising:
puncturing the RS of the first RS type from the first transmission schedule and the RS of the second RS type from the second transmission schedule on the at least one overlapped downlink resource and/or one or more other downlink resources in accordance with at least one muting pattern.

9. The method of claim 1, further comprising:
determining that at least one other downlink resource overlaps with (i) a transmission of the RS of the first RS type scheduled in accordance with the first transmission schedule, (ii) a transmission of the RS of the second RS type scheduled in accordance with the second transmission schedule, (iii) and at least one muting pattern,
wherein monitoring the at least one overlapped downlink resources includes:
puncturing both the RS of the first RS type and the RS of the second RS type from the first transmission schedule and the second transmission schedule, respectively, on the at least one overlapped and muted downlink resource if the first RS collision protocol prioritizes the at least one muting pattern above the first transmission schedule of the first RS type, or
puncturing the RS of the second RS type from the second transmission schedule on the at least one overlapped and muted downlink resource while measuring the RS of the first RS type on the at least one overlapped and muted downlink resource if the first RS collision protocol does not prioritize the at least one muting pattern above the first transmission schedule of the first RS type.

10. The method of claim 1, wherein monitoring the at least one overlapped downlink resources comprises measuring the RS of the first RS type on the at least one overlapped downlink resource in accordance with the first RS collision protocol.

11. A user equipment (UE), comprising:
means for selecting a first Reference Signal (RS) collision protocol based on one or more parameters, the first RS collision protocol characterizing a manner by which the UE handles an overlap on at least one downlink resource of an RS of a first RS type scheduled in accordance with a first transmission schedule and an RS of a second RS type scheduled in accordance with a second transmission schedule, the first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, wherein the one or more parameters comprise one or more resource configuration parameters associated with the first transmission schedule, the second transmission schedule, or a combination thereof; and means for monitoring the at least one overlapped downlink resource in accordance with the selected RS collision protocol.

12. The UE of claim 11,
wherein the first transmission schedule includes one or more periodic transmissions of the RS of the first RS type, or
wherein the first transmission schedule includes one or more aperiodic transmissions of the RS of the first RS type, or
wherein the second transmission schedule includes one or more periodic transmissions of the RS of the second RS type, or
wherein the second transmission schedule includes one or more aperiodic transmissions of the RS of the second RS type, or
any combination thereof.

13. The UE of claim 11, wherein the first RS type and/or the second RS type correspond to a Positioning Reference Signal (PRS), a Narrowband Positioning Reference Signal (NPRS), a Cell-specific Reference Signal (CRS), a Channel State Information (CSI) RS, a synchronization signal, a Demodulation Reference Signal (DMRS), or a Tracking Reference Signal (TRS).

14. The UE of claim 11, wherein the means for monitoring comprises means for measuring the RS of the first RS type on the at least one overlapped downlink resource in accordance with the first RS collision protocol.

15. A user equipment (UE), comprising:
a memory; and
at least one processor coupled to the memory, at least one receiver and at least one transmitter, and configured to:
select a first Reference Signal (RS) collision protocol based on one or more parameters, the first RS collision protocol characterizing a manner by which the UE handles an overlap on at least one downlink resource of an RS of a first RS type scheduled in accordance with a first transmission schedule and an RS of a second RS type scheduled in accordance with a second transmission schedule, the first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, wherein the one or more parameters comprise one or more resource configuration parameters associated with the first transmission schedule, the second transmission schedule, or a combination thereof; and
monitor the at least one overlapped downlink resource in accordance with the selected RS collision protocol.

16. The UE of claim 15,
wherein the first transmission schedule includes one or more periodic transmissions of the RS of the first RS type, or
wherein the first transmission schedule includes one or more aperiodic transmissions of the RS of the first RS type, or
wherein the second transmission schedule includes one or more periodic transmissions of the RS of the second RS type, or
wherein the second transmission schedule includes one or more aperiodic transmissions of the RS of the second RS type, or
any combination thereof.

17. The UE of claim 15, wherein the first RS type and/or the second RS type correspond to a Positioning Reference Signal (PRS), a Narrowband Positioning Reference Signal (NPRS), a Cell-specific Reference Signal (CRS), a Channel State Information (CSI) RS, a synchronization signal, a Demodulation Reference Signal (DMRS), or a Tracking Reference Signal (TRS).

18. The UE of claim 15,
wherein the at least one processor is configured to monitor the at least one overlapped downlink resource by measuring the RS of the first RS type on the at least one overlapped downlink resource in accordance with the first RS collision protocol.

19. A non-transitory computer-readable medium containing instructions stored thereon, which, when executed by a user equipment (UE), cause the UE to perform operations, the instructions comprising:
at least one instruction configured to cause the UE to select a first Reference Signal (RS) collision protocol based on one or more parameters, the first RS collision protocol characterizing a manner by which the UE handles an overlap on at least one downlink resource of an RS of a first RS type scheduled in accordance with a first transmission schedule and an RS of a second RS type scheduled in accordance with a second transmission schedule, the first RS collision protocol characterized by the UE puncturing the RS of the second RS type from the second transmission schedule on the at least one overlapped downlink resource while selectively measuring the RS of the first RS type on the at least one overlapped downlink resource in accordance with the first transmission schedule, wherein the one or more parameters comprise one or more resource configuration parameters associated with the first transmission schedule, the second transmission schedule, or a combination thereof; and
at least one instruction configured to cause the UE to monitor the at least one overlapped downlink resource in accordance with the selected RS collision protocol.

20. The non-transitory computer-readable medium of claim 19,
wherein the first transmission schedule includes one or more periodic transmissions of the RS of the first RS type, or
wherein the first transmission schedule includes one or more aperiodic transmissions of the RS of the first RS type, or
wherein the second transmission schedule includes one or more periodic transmissions of the RS of the second RS type, or
wherein the second transmission schedule includes one or more aperiodic transmissions of the RS of the second RS type, or
any combination thereof.

21. The non-transitory computer-readable medium of claim 19, wherein the first RS type and/or the second RS type correspond to a Positioning Reference Signal (PRS), a Narrowband Positioning Reference Signal (NPRS), a Cell-specific Reference Signal (CRS), a Channel State Information (CSI) RS, a synchronization signal, a Demodulation Reference Signal (DMRS), or a Tracking Reference Signal (TRS).

22. The non-transitory computer-readable medium of claim 19,
wherein the at least one instruction configured to cause the UE to monitor causes the UE to selectively monitor the at least one overlapped downlink resource by measuring the RS of the first RS type on the at least one overlapped downlink resource in accordance with the first RS collision protocol.

23. The method of claim 1,
wherein the first RS collision protocol is selected based on the one or more parameters from a plurality of RS collision protocols, and
wherein the plurality of RS collision protocols further includes a second RS collision protocol characterized by the UE puncturing both the RS of the first RS type and the RS of the second RS type from the first transmission schedule and the second transmission schedule, respectively, on the at least one overlapped downlink resource.

24. The method of claim 23,
wherein the one or more parameters include a periodicity parameter, and
wherein the second RS collision protocol is configured to be selected if a periodicity of the first RS type is equal to a periodicity of the second RS type.

25. The method of claim 23,
wherein the second RS collision protocol is associated with measurement of neither RS of the first RS type nor the RS of the second RS type on any overlapped downlink resource, or
wherein the first RS collision protocol and/or the second RS collision protocol are associated with measurement of an RS from a neighbor base station on one or more overlapped downlink resources while muting the measurements of the RS of the first RS type and the RS of the second RS type on the one or more overlapped downlink resources.

26. The method of claim 3, wherein the first RS type and the second RS type correspond to different NPRS types.

27. The method of claim 26, wherein the at least one downlink resource comprises one or more overlapped resource elements configured for both the first RS type and the second RS type.

28. The method of claim 27, wherein the one or more overlapped resource elements configured for both the first RS type and the second RS type are not used for any measurement associated with the second RS type due to the puncturing in accordance with the first RS collision protocol.

* * * * *